United States Patent
Carter et al.

(10) Patent No.: US 6,249,907 B1
(45) Date of Patent: Jun. 19, 2001

(54) METHOD SYSTEM AND ARTICLE OF MANUFACTURE FOR DEBUGGING A COMPUTER PROGRAM BY ENCODING USER SPECIFIED BREAKPOINT TYPES AT MULTIPLE LOCATIONS IN THE COMPUTER PROGRAM

(75) Inventors: Derek Kneil Carter, Morgan Hill, CA (US); Ronald Wessels, Mississauga (CA); Della Ann Yukihiro, San Jose, CA (US)

(73) Assignee: International Business Machines Corporation

(*) Notice: Subject to any disclaimer, the term of this patent is extended or adjusted under 35 U.S.C. 154(b) by 0 days.

(21) Appl. No.: 09/046,977

(22) Filed: Mar. 24, 1998

(51) Int. Cl.[7] .................................................. G06F 9/45
(52) U.S. Cl. ............................................... 717/4; 717/8
(58) Field of Search .............................. 395/704; 717/4, 717/8

(56) References Cited

U.S. PATENT DOCUMENTS

| | | | |
|---|---|---|---|
| 4,080,650 | 3/1978 | Beckett | 717/4 |
| 4,338,660 | 7/1982 | Kelley et al. | 714/34 |
| 4,819,234 | 4/1989 | Huber | 714/38 |
| 4,866,665 | 9/1989 | Haswell-Smith | 714/35 |
| 5,093,914 | 3/1992 | Coplien et al. | 717/4 |
| 5,140,671 | 8/1992 | Hayes et al. | 706/60 |
| 5,319,645 | 6/1994 | Bassi et al. | 714/38 |
| 5,367,550 | 11/1994 | Ishida | 377/39 |
| 5,371,746 | 12/1994 | Yamashita et al. | 714/38 |
| 5,446,900 | 8/1995 | Kimelman | 717/4 |
| 5,493,664 | 2/1996 | Doi | 711/100 |
| 5,533,192 | 7/1996 | Hawley et al. | 714/28 |
| 5,535,318 | 7/1996 | Motoyama et al. | 707/514 |
| 5,621,886 | 4/1997 | Alpert et al. | 714/38 |
| 5,778,230 | * 7/1998 | Wimble et al. | 717/4 |
| 5,802,371 | * 9/1998 | Meier | 717/4 |
| 5,933,639 | * 8/1999 | Meier et al. | 717/4 |

FOREIGN PATENT DOCUMENTS 0730227   3/1996  (EP).

OTHER PUBLICATIONS

Intersimone, Advanced Debugging Techniques, Computer Language, v7, n2, p59(7), Feb. 1990.*

Burgess, Deliver defect-free VB code, Data based Advisor, v 11, n4, p132(4), Apr. 1993.*

Bourne, Getting the bugs out (debugging tools in Ask Group's Ingres Windows4GL and Powersoft's Powerbuilder DBMS applications software, DBMS, v7, n7, p54(3), Jun. 1994.*

Reed, C + + debugging in the real world, EXE, v9, n1, p16(3), Jun. 1994.*

(List continued on next page.)

Primary Examiner—Mark R. Powell
Assistant Examiner—Hoang-Vu Antony Nguyen-Ba
(74) Attorney, Agent, or Firm—David W. Victor; Konrad Raynes & Victor

(57) ABSTRACT

Disclosed is a system for debugging a computer program. A user indicates a specified breakpoint type, such as a program statement, variable reference, command, etc. The program, including program statements, is then compiled. During compilation, the compiler locates statements in the program corresponding to the breakpoint types and generates a function call into the program at instances in the program of statements corresponding to the user specified breakpoint types. During a debugging phase, a debugger may execute an executable version of the program, including the function calls. Upon processing the function calls, the debugger may stop execution of the program and pass control to the user to perform debugging operations.

20 Claims, 4 Drawing Sheets

OTHER PUBLICATIONS

Adams, Intercepting DLL function calls (programming and debugging Microsoft Windows graphical interface), Windows–DOS Developer's Journal, v3, n6, p22(6), Jun. 1992.*

Nicolaisen, Development tools (SoftIce for Windows NT), Computer Shopper, v16, n4, p. 603, Apr. 1997.*

Borland, A Sample Debugging Session using the BC5 Integrated Debugger, Web Site http://www.borland.com/techpubs/borlandcpp/debugger/dbug_xmp.htm.

SimICS, Introduction to SimICS, Web Site http://www.sics.se/simics/intro.htm.

Nicolaisen, Nancy, Development Tools (SoftIce for Windows NT Product Information), Computer Shopper Apr. 1997, (c) 1997 Ziff Davis Publishing.

O'Morain, Sterns and Geary, Developer magic (TM) Debugger User's Guide, Silicon Graphics Web Site http://brtzxa.fddi.uni–bayreuth.de:88/SGI_Developer/Debugger_UG/2.

PC Magazine, Mar. 16, 1993, Comparing the Mainstays: CodeView and Turbo Debugger.

PC Magazine, Aug. 1987, Debugger Can Set up to Ten Types of Breakpoints.

PC Magazine, Mar. 17, 1992, Toolkits—Periscope/EM: Debugging with No Impact on Runtime Environment.

PCMagazine, Apr. 16, 1991, Lotus 1–2–3 Add–Ins—Macro Editor/Debugger.

InfoWorld, May 13, 1996, Product Comparison—Debugging—Borland C++ Development Suite 5.0.

InfoWorld, May 16, 1994, Reviews/Product Comparison—SQL front ends—PowerBuilder and SQLWindows.

IBM Corporation, 1994, CoOperative Development Environment/400—Debug Tool, IBM Doc. No. SC09–1905–00.

IBM Corporation, 1995, Debug Tool—User's Guide and Reference, Release 2, IBM Doc. No. SC09–2137–01.

IBM Corporation, Visual Age for COBOL Version 2.1, VisualAge PL/I Version 2.0—Tools guide for OS/2 Second Edition, Sep. 1997, IBM Doc. No. SC26–9036–01.

* cited by examiner

METHOD SYSTEM AND ARTICLE OF MANUFACTURE FOR DEBUGGING A COMPUTER PROGRAM BY ENCODING USER SPECIFIED BREAKPOINT TYPES AT MULTIPLE LOCATIONS IN THE COMPUTER PROGRAM

BACKGROUND OF THE INVENTION

1. Field of the Invention

The present invention relates to a system for assisting a programmer in debugging a computer program to detect errors in the program logic.

2. Description of the Related Art

A computer source program is typically initially written in a high level computer language, also called source code, comprising descriptive statements of the actions the code will cause the computer to perform. High level computer languages include C++, FORTRAN, COBOL, JAVA™, etc. JAVA is a trademark of Sun Microsystems, Inc. A source program written in such a high level language must be converted into object or machine code, i.e., strings of zeros and ones, which the computer can execute to carry out the steps specified by the program. A compiler program is a computer program that receives as input source code and generates as output object code which may be loaded into the computer memory and executed.

FIG. 1 illustrates the compilation process. A compiler 2 receives as input a program in source code 4 and generates object code 6. The term "program" as used herein refers to the user program in any state, whether processed or unprocessed, from the high level language source code 4 form to the executable object code 6 form.

Oftentimes, the source code 4 will include "bugs." Bugs are logical errors in the original source code 4 that cause unexpected results during the execution of the object code 6. These unexpected results may cause the computer executing the object code 6 to generate unintended output and erroneous data, or terminate prematurely.

Compiler programs include a debugging feature that generates information that is used to diagnose bugs and errors in the source code. Before compiling source code 4, the user may set a debug option that causes the compiler 2 to generate an object code 6 file that includes debugging information and tables. A debugger program uses this debugging information during debugging operations. For instance in International Business Machine Corporation's (IBM®), the assignee of the subject patent application, VISUALAGE® for Cobol product, the user selects the TEST option before compiling the source program to generate the debugging information and tables. VISUALAGE and IBM are registered trademarks of International Business Machines, Corporation.

After compiling the source code 4 into executable object code 6, the user may run the debugger program and execute the object code 6 program in a debug mode. The debugger program provides a user interface programming tool that allows the user to control the execution of the program by executing only one program instruction at a time (single-stepping), determining the next instruction to be executed, examining and/or modifying computer register and memory locations, and setting breakpoints at particular locations within the program to stop execution of the program at the breakpoint. Preferably the breakpoint is set right before the error occurs to stop program execution and allow the user to take control through the debugger program and monitor the program's execution through the portion of code including the errors.

A breakpoint causes the program to cease executing at a certain point within the program. The user sets breakpoints with the debugger program user interface. The user can specify a breakpoint at: a particular line to stop execution when a specific line in the source code is reached; an entry to stop execution when an entry point is called; an address breakpoint to stop execution at a specific address; a storage change breakpoint to stop execution when data is written to a specified address; and a load occurrence breakpoint to stop execution when a Dynamic Link Library (DLL) file is loaded.

When executing the program and debugger program simultaneously, control may transfer to the debugger program upon processing the breakpoints in the program. Once the debugger program has control and program execution stops, the user can perform various debugging operations. For instance, upon reaching the breakpoint, the user can specify the display of certain expressions or values.

In interactive debugging systems, a graphical user interface may be used to allow the programmer to insert breakpoints within the source code with an input device such as a mouse. The user can examine the source code program in a graphical user interface and mouse "click" a location in the program to insert a breakpoint. The debugger will then execute the object code and display the original source code for the user to follow during the processing of the corresponding object code. Other systems allow the user to enter a breakpoint command on a command line to insert a specific breakpoint. After the program execution stops at a breakpoint, the user may then perform various debugging operations to check the value of variables, etc.

In prior art debugging systems, to set breakpoints for a specific program statement type, the user must locate the specific statement type in the program and then manually set the breakpoint for the located statement type. Moreover, in order to accommodate new breakpoint types, the compiler developer would have to modify the compiler code to change how the compiler generates debugging information during the compilation of the program.

SUMMARY OF THE PREFERRED EMBODIMENTS

To overcome the limitations in the prior art described above, the present invention discloses a system for debugging a computer program. A user indicates a specified breakpoint type. The program, including program statements, is then compiled. During compilation, statements in the program corresponding to the user specified breakpoint types are located and a function call is generated in the program at the statements corresponding to the user specified breakpoint types. An executable version of the program, including the function calls, is then executed. Upon processing the function calls, execution of the executable version of the program may stop.

In further embodiments, the user may indicate at least one active breakpoint type at which to stop execution. In such case, the step of stopping execution of the program occurs upon processing a function call corresponding to one of the active breakpoint types.

In yet further embodiments, the user specified breakpoint type may be a variable reference, a date reference, a middleware statement, a file input/output statement, a conditional statement or a command statement.

Preferred embodiments provide a more efficient method of inserting breakpoints into a program by generating function calls into the program for each instance of the user selected breakpoint type during compilation of the program. During debugging mode, the user may cause the program to stop executing at the instances of the inserted function calls. Moreover, with the preferred embodiments, to add a new breakpoint type to be generated into the program during compilation, the compiler developer need only add a function call to the compiler code and corresponding recognition of that function call to the debugger program for the new breakpoint type. The compiler developer need not modify how the compiler generates debugging information to accommodate the new breakpoint type.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
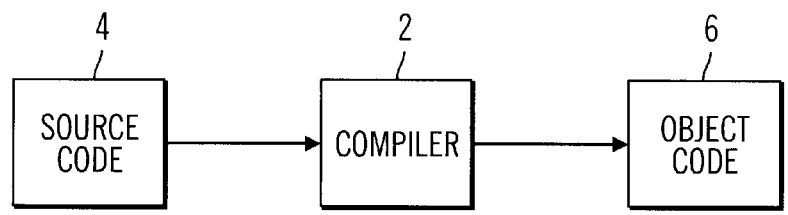
FIG. 1 illustrate the steps in compiling source code into object code.
Figure 2:
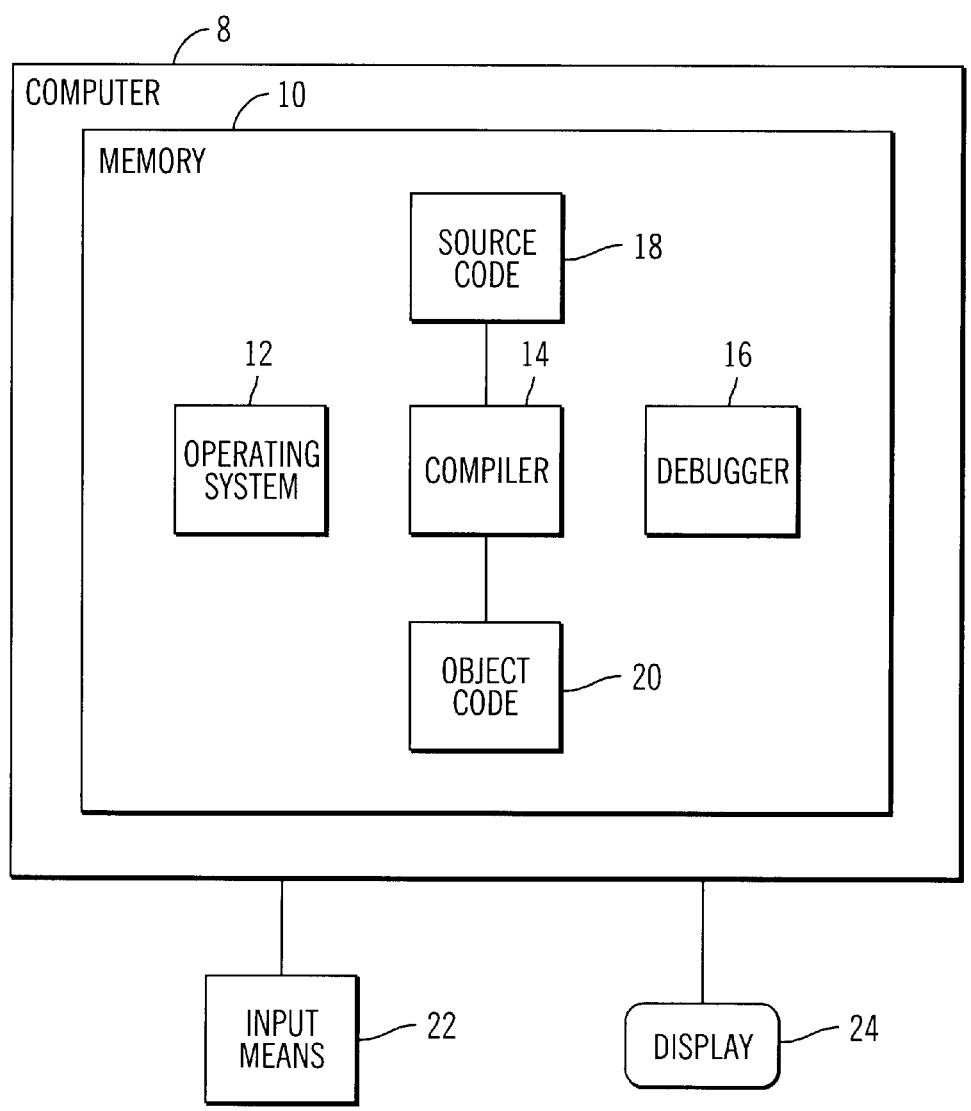
FIG. 2 is a block diagram illustrating a software and hardware environment in which preferred embodiments of the present invention are implemented.

FIG. 2 illustrates a preferred hardware and software environment in which preferred embodiments of the present invention may be implemented. A computer 8 includes a memory 10. The computer 8 may be a personal computer, workstation, mainframe, etc. The memory 10 includes an operating system 12, a compiler 14, and a debugger 16. The memory 10 may be any suitable volatile memory known in the art, e.g., RAM, DRAM, SRAM, etc., or a combination of volatile and non-volatile memory, e.g., hard disk drives, to provide storage space for programs, whether they are being executed or not. The operating system 12 may be any suitable operating system such as AIX®, OS/390™, UNIX®, OS/2™, MVS™, WINDOWS®, etc. AIX, OS/390, MVS, and OS/2 are trademarks of IBM; WINDOWS is a registered trademark of Microsoft Corporation; UNIX is a registered trademark licensed by the X/Open Company LTD. The compiler 14 includes features typically found in compiler products to process a program comprised of source code 18 and generate object code 20, such as the IBM VisualAge for COBOL compiler. The debugger 16 includes features common to debugger programs, such as the Microsoft VISUAL C++® debugger, BORLAND C++® debugger, the IBM Debug Tool, the debugger included with VisualAge for COBOL, etc., to allow a user to insert breakpoints and set other debugging options to control debugging operations. Microsoft VISUAL C++ and BORLAND C++ are registered trademarks of Microsoft Corporation and Borland International, Inc., respectively. The VisualAge for COBOL compiler and debugger, which is implemented in a workstation and personal computer environment, e.g., OS/2, is described in IBM publication "VisualAge for COBOL, Version 2.1," IBM publication no. SC26-9036-01 (IBM Copyrights 1992, 1997), which publication is incorporated herein by reference in its entirety. The Debug Tool debugger, which is implemented in a mainframe environment, e.g., OS/390, MVS, is described in IBM publication "Debug Tool User's Guide and Interface, Release 2" IBM publication no. SC09-2137-01 (IBM Copyright, 1995), which publication is incorporated herein by reference in its entirety. The compiler 14 and debugger 16 would also include additional logic to implement the preferred embodiments of the present invention. The debugger program 16 may be included in the compiler 14 or exist as a separate stand-alone program.

After the compiler 14 generates the object code 20, the computer 2 may execute the object code 20. If the user specifies the debugging option, the computer 2 would also execute the debugger 16 to allow the user to perform debugging operations by using the debugger 16 to control the execution of the object code 20. In certain embodiments, the debugger 16 and object code 20 may be executing as threads within the same process and can share addressable memory space. In alternative embodiments, the debugger 16 and object code 20 may be executing as distinct processes and cannot share the same addressable memory space. Typically, the two process method is implemented in a workstation environment and the single process method is implemented in a mainframe computer environment.

The debugger 16 and program when executing may communicate via the operating system 12. In the embodiments where the debugger 16 and the program execute in separate processes, the debugger 16 can control the execution of the object code 20 or obtain information on the execution of the object code 20 via system calls, i.e., APIs, to the operating system 12, which in turn directly controls the execution of the object code 20. In the embodiments where the debugger 16 and object code 20 execute within the same process, calls to the debugger 16 can be placed in the object code 20 so that during the execution of the object code 20, the object code 20 can call, via the operating system 12, subroutines of the debugger 16 to pass control to the debugger 16. Preferred embodiments of the present invention may be implemented in either environment, i.e., the execution of the debugger 16 and object code 20 may be in the same or different processes.

A user controls computer 8 operations via a display 24, which may be any suitable display device known in the art, and an input means 22, which may be a keyboard, mouse, pen-stylus, voice activated input, etc.

In preferred embodiments the debugger 16 generates a graphical user interface (GUI) on the display 24 through which the user may set debugging options and control debugging operations.

Compilation and the Debugger

As discussed, before initiating the compiling operation, the user may set an option that causes the compiler 14 to generate debugging information, such as a symbol table and line number information, that is used by the debugger 20. In preferred embodiments, prior to compilation, the user may specify breakpoint types, which may be any type of computer statement or reference, including commands, variable references, entry points, file input/outputs or any other expressions. During compilation, the compiler 14 will generate breakpoint indicators or "hooks" into the object code 18 at each instance in the program of the statement corresponding to the user specified breakpoint type. Hooks are instructions the compiler 14 inserts into the program, usually the object code 20, during compilation. The hooks can be used to set breakpoints that instruct the debugger 16 to gain control of the program at specific points in the program. The hooks may be inserted at the entrances and exits of blocks, at statement boundaries, and at points in the program where program flow might change, such as before and after a procedure call.

Prior to compilation, the user may set a debugging option to cause the compiler 14 to generate debugging information that retains information on program variables, their attributes, and location in storage. Prior to compilation, the user may also select breakpoint types where the user wants breakpoints, i.e., hook function calls, to be inserted in the object code 20. When the user runs the compiler 14, the compiler 14 would then insert debug hook function calls at the instances of the statements in the program corresponding to the user specified breakpoint types. In this way, during compilation, hook function calls are automatically generated into the program for all user specified breakpoint types. When the debugging options are set prior to compilation, the compiler 14 produces debugging information that the debugger 16 uses during debugging.

After the program is compiled and executable object code 20 is generated including the hook function calls inserted by the compiler 14, the user may execute the program and debugger 16, such that the debugger 16 can control the execution of the program. Prior to executing the debugger 16, the user would select a set of active breakpoints at which the debugger 16 will cause the program to stop executing. When the program processes a hook call corresponding to one of the active breakpoints set by the user, the debugger 16 will cause the program to stop running. At this point, the debugger 16 may take control of the program and provide the user with various debugging options to obtain information on the state of the program at the breakpoint, such as checking the value of variables and examining storage contents. In this way, the debugger 16 allows the user to interactively participate in the debugging process.

Figure 3:
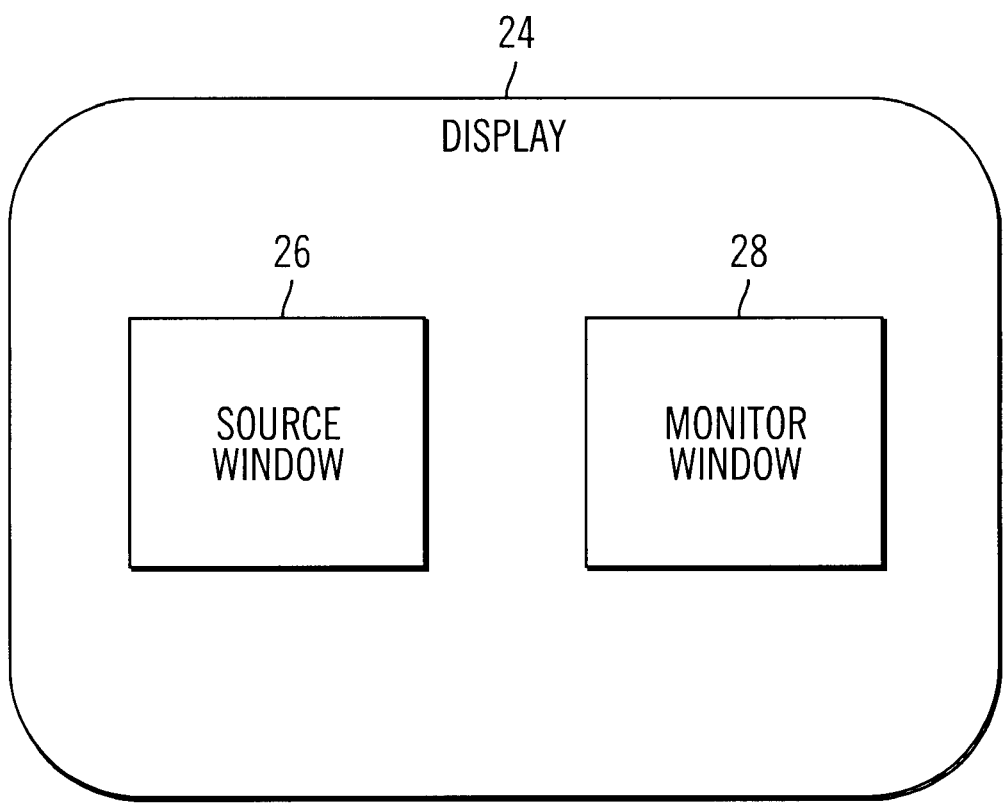
FIG. 3 illustrates a user interface displayed on a display monitor for allowing the user to interface with a debugger program in accordance with preferred embodiments of the present invention.

In preferred embodiments, the debugger 16 generates a user interface on the display 24 to provide the user with various debugging options. FIG. 3 illustrates two windows 26, 28 displayed in the display 24 by the debugger 16. The source window 26 displays the source code 18 corresponding to the object code 20 being executed. The monitor window 28 may continuously display the value of monitored variables and other relevant data. In further embodiments, the user interface may include a command line in which the user may enter debugging commands. In preferred embodiments, the user may toggle between the windows 26, 28. In alternative embodiments, the windows 26, 28 may be resizable and viewed simultaneously.

The following are examples of user specified breakpoint types that the user may set before compilation to cause the compiler 14 to generate hook functions calls into the program for the instances of statements corresponding to the user specified breakpoint types.

A command reference (varname) would instruct the compiler 14 to generate a hook function call for all variable references to the variable "varname." "Varname" could be the name of a particular variable name. In such case, the compiler 14 would generate a hook function call including the address of the variable reference as a parameter into the program at all instances of variable references to "varname" when compiling the source code 18 into object code 20 Alternatively, if a "*" was set for "varname," then the compiler 14 would generate a hook function call at all instances of variable references. During debugging, the user may select a set of active variable references from those breakpoint type variable references for which hook function calls were generated into the program using the "reference (varname)" command prior to compilation. When executing the program in debugging mode, execution of the program will halt at the location where the hook function calls corresponding to the active breakpoint types were generated.

During the debugging phase when the object code 20 is executing, the program would process the hook function call for the user specified variable reference and pass the address of the variable reference in the object code 20 to the hook function call. The debugger 16 would then compare the passed address (passed as a parameter to the hook function call) with the addresses for the user specified active variable references. If the debugger 16 determines that the address of the passed parameter matches one of the addresses of the active variable references the user selected, then the debugger 16 will cause the program to stop executing and provide control to the user to perform debugging operations.

Another compiler command would instruct the compiler to add a debug hook function call for all user specified date reference statements. If during debugging, the user specifies that date reference statements are active breakpoints, then the debugger 16 will cause the program to stop executing whenever the debugger hook function call for the date reference statement is processed. Control is then passed to the debugger 16 and user to perform debugging operations.

A "middleware(system)" breakpoint command would instruct the compiler 14 to generate debug hook function calls for all middleware statements, i.e., software that functions as a translation layer, such as DB2, CICS, etc. This could enable the debugger to break execution whenever a middleware statement is reached in the object code 20.

A "fileio" breakpoint would cause the compiler to generate debugger hook functions calls at all file input/output statements, e.g., OPEN, READ, WRITE, CLOSE, etc., thereby enabling the debugger 16 to stop execution of the program at all file input/output statements.

A verb(verb statement) breakpoint command could instruct the compiler 14 to generate debug hook function calls for all verb statements for a high level language, such as COBOL, C++, FORTRAN, etc. If the user has set the verb breakpoint types active for debugging, then the debugger 16 would cause the program to stop executing when the hook function call for the verb is reached.

In this way, prior to compilation, the user may indicate the breakpoint types and the compiler 14 would generate the hook function calls for the selected breakpoint types into the object code 20 during compilation. The compiler 14 maintains a set of debugger hook function names to insert for each instance of the user defined breakpoint type in the program. In preferred embodiments, whenever a compiler developer wants to create new, yet undefined, breakpoint types, specific conditional statements such as ELSE or any other heretofore undefined breakpoint types, the compiler developer need only create a hook function call in the compiler 14 and recognition for that hook function call in the debugger 16 to that new breakpoint type. In preferred embodiments, to add new breakpoint types, the compiler developer need not alter how the compiler 14 generates debugging information to accommodate the new breakpoint type.

Thus, the preferred embodiments of the compiler 14 and debugger 16 components may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Generating and Handling Breakpoints

Figure 4:
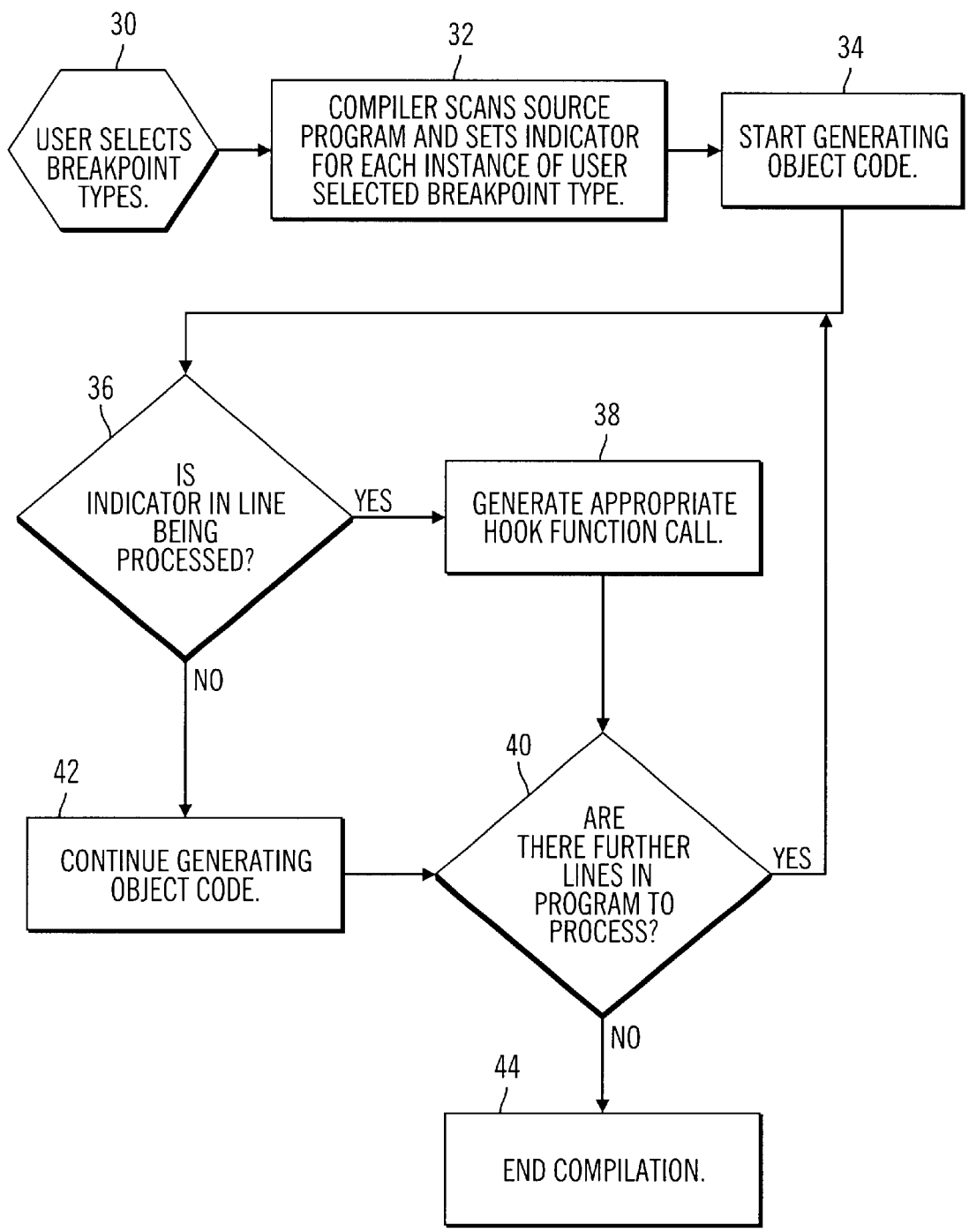
FIG. 4 illustrates logic to generate breakpoints in the program in accordance with preferred embodiments of the present invention.

FIG. 4 illustrates logic implemented in the compiler 14 for generating debugger hook function calls and related debugging information into the object code 20 in accordance with preferred embodiments of the present invention.

Control begins at block 30 which represents the user selecting one or more breakpoint types prior to compilation of the source code 18. During the semantic analysis of the source code 18, at block 32, the compiler 14 scans the source code 18 and generates a breakpoint indicator, i.e., a flag, in the program at each instance of statements corresponding to the user specified breakpoint types, e.g., program statement, variable reference, etc., in the program. The indicator may be at the line in the program where the statement corresponding to the breakpoint type is located or at some other location. Control then transfers to block 34 which represents the code generation phase at which the compiler 14 converts the processed source code 18 to executable object code 20. Control transfers to block 36 which is a decision block representing the compiler 14 determining whether a breakpoint indicator was set in the line being processed. If so, control transfers to block 38 which represents the compiler 14 generating the appropriate hook function call where the indicator is set. In preferred embodiments, the compiler 14 inserts a unique hook function call corresponding to the user specified breakpoint type. In alternative embodiments, a single hook function call can be used for multiple user specified breakpoint types.

For instance, there could be a specific debug hook function call for a user specified variable reference, middleware statement, file input/output statement, command or any other breakpoint type. These hook function calls may include parameters to pass information to the debugger 10 during the debugging stage. For instance, if the user selected breakpoint type is a variable reference, then the address of the variable reference would be passed to the debugger 10 via the debug hook function call.

From block 38 control transfers to block 40 which represents the compiler 14 determining whether there are further lines in the program to compile. If so, control transfers back to block 36 to generate hook function calls for any further indicators. If at block 36 an indicator is not set at the line being processed, then control transfers to block 42 to continue processing the program until, at block 40, the compiler 14 determines that there are no further lines to process. In such case, control transfers to block 44 which represents the completion of compilation.

Figure 5:
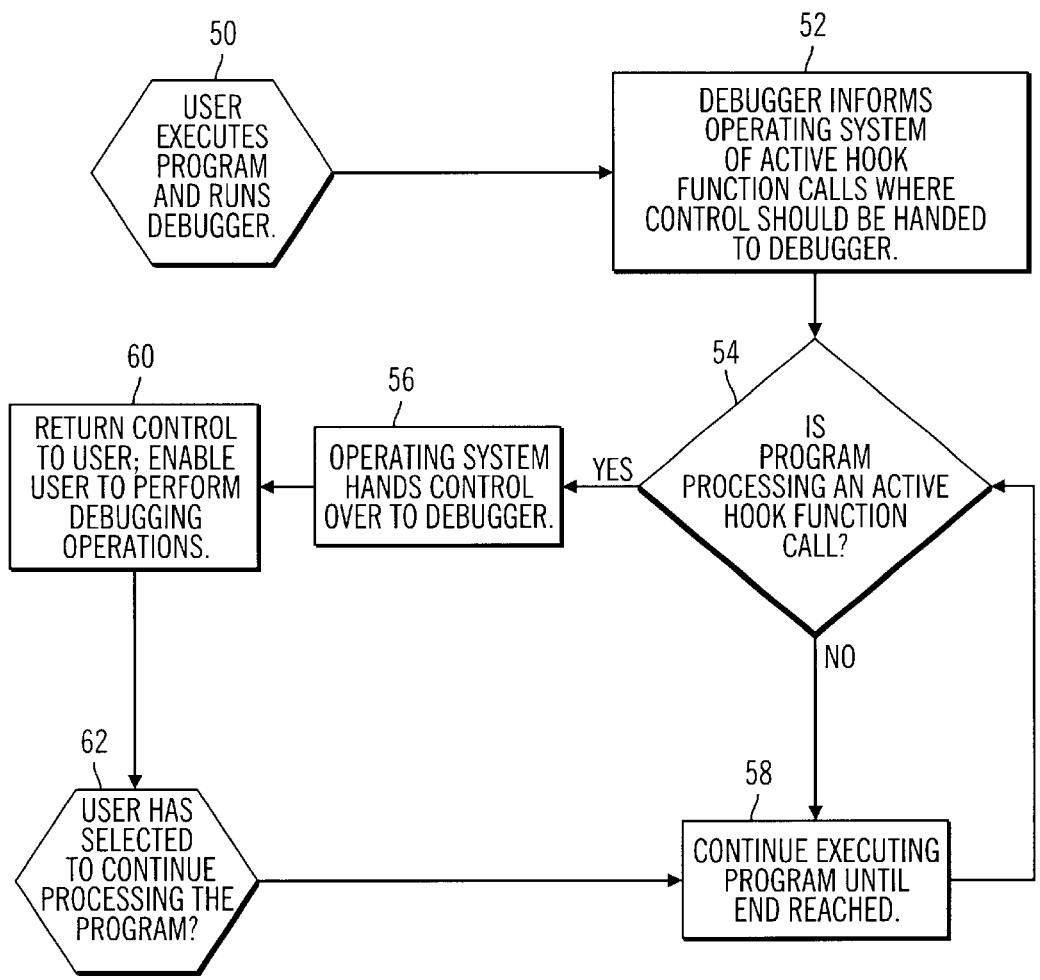
FIG. 5 illustrates logic to perform debugging operations in accordance with preferred embodiments of the present invention.

FIG. 5 illustrates logic implemented in the debugger 16 to perform debugging operations to diagnose errors and bugs in the program. Control begins at block 50 which represents the user running the debugger 16 and executing the program under control of the debugger 16. Prior to executing the program, the user may set active breakpoint types corresponding to function calls at which execution will be stopped. Control transfers to block 52 which represents the debugger 16 informing the operating system 12 of the active breakpoint types, i.e., those hook function calls in the program at which execution of the program should be stopped and control transferred to the debugger 16. Control transfers to block 54 which represents the operating system 12 determining whether the program is processing an active hook function call. If so, control transfers to block 56; otherwise, control transfers to block 58.

If the program is processing an active hook function call, then at block 56, the operating system 12 stops the execution of the program and hands control over to the debugger 16. If the processed hook function call was for a variable reference breakpoint type, then the program would pass the address of the variable reference to the debugger 16 and the debugger 16 would determine whether the passed address matches an address of one of the active variable reference breakpoint types selected by the user. If the passed address matches the active variable reference address, then the debugger would return control to the user. Otherwise, the debugger 16 would cause the program to continue executing. After the operating system 12 transfers control to the debugger 16 at block 56, control transfers to block 60 which represents the debugger 16 returning control to the user to allow the user to perform debugging operations. Block 62 represents the state where the user has selected to continue processing the program. From blocks 54 and 62, control transfers to block 58 to continue executing the program until the end is reached. From block 58, control transfers back to block 54 to handle any further instances of active function calls in the program.

Conclusion

This concludes the description of the preferred embodiments of the invention. The following describes some alternative embodiments for accomplishing the present invention.

Preferred embodiments were described with respect to using the compiler 14 to insert breakpoints. However, in further embodiments, the compiler 14 could insert additional user specified entries, such as watchpoints. A watchpoint stops execution whenever the value of an expression changes.

Preferred embodiments concern specific user specified breakpoint types, such as variable references, middleware statements, language verbs, etc. However, any other user specified program statement, class of program statements, subroutine or method in a class, program condition or occurrence of an event could be a breakpoint type in accordance with preferred embodiments of the present invention.

Preferred embodiments for generating hook function calls during compilation were implemented in the program logic of the compiler 14. In alternative embodiments, certain of the logic described as being performed by the compiler 14 and/or debugger 16 may be carried out by hardware within the computer 8 or any other associated application program.

Preferred embodiments described specific actions occurring during specific phases of the compilation and debugging process. For instance, the user would specify breakpoint types prior to compilation, breakpoint indicators are generated during the semantic analysis of the program, the hook function calls are generated into the program during the code generation phase of compilation, and the user selects active breakpoint types at which to stop execution prior to executing the program in debugging mode. However, in alternative embodiments, these and other events described herein may occur at different points in the compilation and debugging processes than described above.

In summary, preferred embodiments in accordance with the present invention provide a system for debugging a computer program. A user indicates a specified breakpoint type. The program, including program statements, is then compiled. During compilation, statements in the program corresponding to the user specified breakpoint types are located and a function call is generated in the program at the statements corresponding to the user specified breakpoint types. An executable version of the program, including the function calls, is then executed. Upon processing the function calls, execution of the executable version of the program may stop.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for debugging a program, including computer program statements, comprising:

(a) receiving user input indicating at least one user specified breakpoint type;

(b) compiling the program, wherein during the compiling of the program into an executable version, the computer performs:

(i) locating instances of statements in the program corresponding to the user specified breakpoint types;

(ii) setting a breakpoint indicator at the location of the statement in the program corresponding to the user specified breakpoint type during a semantic analysis portion of the compiling of the program;

(iii) processing the breakpoint indicator;

(iv) generating a function call in the program at instances in the program of the statements corresponding to the user specified breakpoint types at instances of the breakpoint indicator;

(c) executing the executable version of the program;

(d) processing the function calls during the execution of the program; and (e) stopping execution of the program in response to processing the function calls.

2. The method of claim 1, wherein the user specified breakpoint type is a variable reference.

3. The method of claim 1, wherein the user specified breakpoint type is a member of the set of breakpoint types comprising:

a date reference;

a middleware statement;

a file input/output statement;

a conditional statement; and a command statement.

4. A method for debugging a program, including computer program statements, comprising:

(a) receiving user input indicating at least one user specified breakpoint type comprising a variable reference;

(b) compiling the program, wherein during the compiling of the program into an executable version, the computer performs:

(i) locating instances of statements in the program corresponding to the user specified breakpoint types; and (ii) generating a function call in the program at instances in the program of the statements corresponding to the user specified breakpoint types;

(c) indicating at least one active variable reference at which to stop execution;

(d) executing the executable version of the program;

(e) processing the function calls during the execution of the program;

(f) passing an address of a variable reference in the program as a parameter to the function call;

(g) stopping execution of the program in response to processing the function calls after determining that the passed address matches at least one of the indicated active variable references.

5. The method of claim 4, further including:

setting a breakpoint indicator at the location of the statement in the program corresponding to the user specified breakpoint type;

processing the breakpoint indicator, wherein the function call is generated at instances of the breakpoint indicator.

6. The method of claim 4, wherein the function calls for the breakpoint types are generated into the program during a code generation portion of the compiling of the program.

7. The method of claim 4, further comprising the step of passing control to a debugger program upon stopping execution of the program, wherein the user may perform debugging operations.

8. The method of claim 7, wherein the debugger program executes within a first process and wherein the program executes within a second process, wherein the first process and second process are capable of executing simultaneously.

9. A computer system for debugging a computer program, comprising:

(a) a computer;

(b) an input means for indicating a user specified breakpoint type comprising a variable reference; and (c) program logic for controlling the computer, wherein the program logic includes:

(i) means for compiling a program;

(ii) means for locating instances of statements in the program corresponding to the user specified breakpoint types;

(iii) means for generating function calls in the program at the instances of the statements corresponding to the user specified breakpoint types;

(iv) means for generating an executable version of the program, including the function calls at the statements corresponding to the breakpoint types;

(v) means for indicating at least one active variable reference at which to stop execution;

(vi) means for executing the executable version of the program;

(vii) means for passing an address of a variable reference in the program as a parameter to the function call being processed; and (viii) means for determining whether the passed address matches at least one of the indicated active variable references, wherein execution of the program stops upon determining that the passed address matches one of the indicated active variable references.

10. The computer system of claim 9, further including:

means for setting a breakpoint indicator at the location of the statements in the program corresponding to the user specified breakpoint types;

means for processing the breakpoint indicator; and means for generating the function call for the breakpoint type in response to processing the breakpoint indicator.

11. The computer system of claim 9, further comprising means for passing control to a debugger program upon stopping execution of the object program, wherein the user may perform debugging operations.

12. The computer system of claim 11, further including means for executing the debugger program within a first process and means for executing the program within a second process, wherein the first and second processes are capable of executing simultaneously.

13. An article of manufacture for use in programming a computer to process a program comprised of program statements, the article of manufacture comprising at least one computer readable storage device including at least one computer program embedded therein that causes the computer to perform:

(a) receiving input indicating at least one user specified breakpoint type;

(b) compiling the program, wherein during the compiling of the program into an executable version, the computer performs:

(i) locating instances of statements in the program corresponding to the user specified breakpoint types;

(ii) setting a breakpoint indicator at the location of the statement in the program corresponding to the user specified breakpoint type during a semantic analysis portion of the compiling of the program;

(iii) processing the breakpoint indicator;

(iv) generating a function call in the program at instances in the program of the statements corresponding to the user specified breakpoint types at instances of the breakpoint indicator;

(c) executing the executable version of the program;

(d) processing the function calls during the execution of the program; and (e) stopping execution of the program in response to processing the function calls.

14. The article of manufacture of claim 13, wherein the user specified breakpoint type is a variable reference.

15. The article of manufacture of claim 13, wherein the user specified breakpoint type is a member of the set of breakpoint types comprising:

a date reference;

a middleware statement;

a file input/output statement;

a conditional statement; and a command statement.

16. An article of manufacture for use in programming a computer to process a program comprised of program statements, the article of manufacture comprising at least one computer readable storage device including at least one computer program embedded therein that causes the computer to perform:

(a) receiving user input indicating at least one user specified breakpoint type comprising a variable reference;

(b) compiling the program, wherein during the compiling of the program into an executable version, the computer performs:

(i) locating instances of statements in the program corresponding to the user specified breakpoint types; and (ii) generating a function call in the program at instances in the program of the statements corresponding to the user specified breakpoint types;

(c) indicating at least one active variable reference at which to stop execution;

(d) executing the executable version of the program;

(e) processing the function calls during the execution of the program;

(f) passing an address of a variable reference in the program as a parameter to the function call;

(g) stopping execution of the program in response to processing the function calls after determining that the passed address matches at least one of the indicated active variable references.

17. The article of manufacture of claim 16, further including:

setting a breakpoint indicator at the location of the statements in the program corresponding to the user specified breakpoint types;

processing the breakpoint indicator, wherein the function call is generated at instances of the breakpoint indicator.

18. The article of manufacture of claim 16, wherein the function calls for the breakpoint types are generated into the program during a code generation portion of the compiling of the program.

19. The article of manufacture of claim 16, further causing the computer to perform the step of passing control to a debugger program upon stopping execution of the program, wherein the user may perform debugging operations.

20. The article of manufacture of claim 19, wherein the debugger program executes within a first process and wherein the program executes within a second process, wherein the first process and second process are capable of executing simultaneously.

* * * * *